(No Model.)
W. H. SHENEMAN.
MINER'S PICK.
No. 266,057. Patented Oct. 17, 1882.
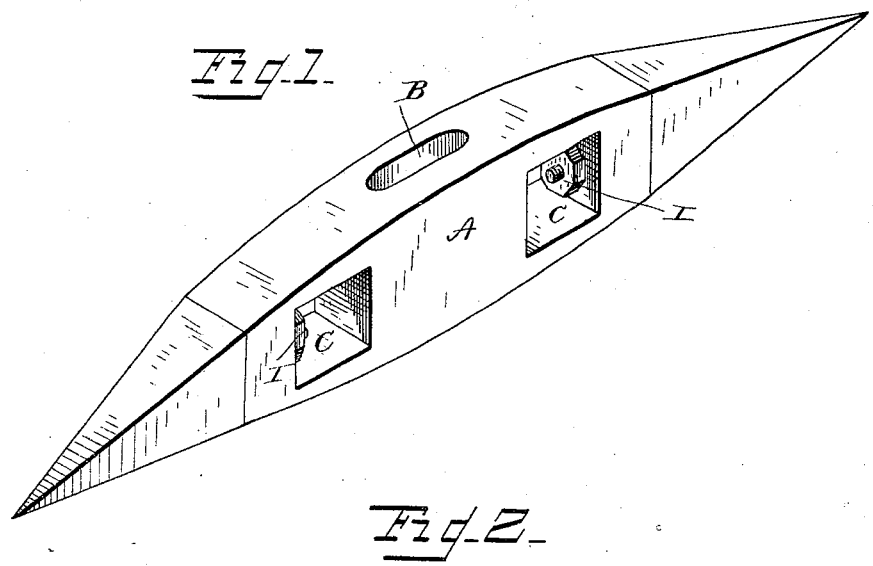
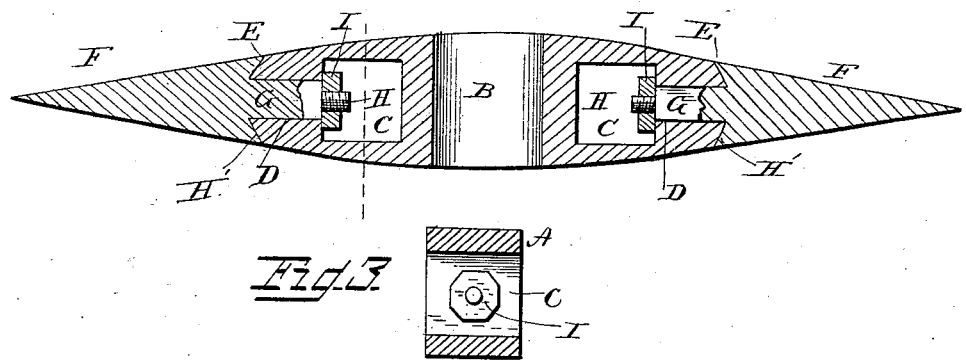
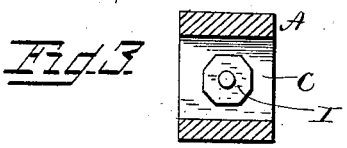
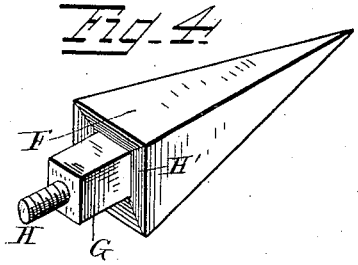
WITNESSES
INVENTOR
Wm. H. Sheneman,
by C. A. Snow & Co.
Attorneys.

United States Patent Office.

WILLIAM H. SHENEMAN, OF MARYSVILLE, OHIO.

MINER'S PICK.

SPECIFICATION forming part of Letters Patent No. 266,057, dated October 17, 1882.

Application filed August 18, 1882. (No model.)

*To all whom it may concern:*

Be it known that I, W. H. SHENEMAN, of Marysville, in the county of Union and State of Ohio, have invented certain new and useful Improvements in Miners' Picks; and I do hereby declare that the following is a full, clear, and exact description of the invention, which will enable others skilled in the art to which it appertains to make and use the same, reference being had to the accompanying drawings, which form a part of this specification.

Figure 1 is a perspective view of my improved pick. Fig. 2 is a longitudinal sectional view. Fig. 3 is a cross-section on the line $x\ x$, Fig. 2, and Fig. 4 is a perspective view of one of the points detached.

Similar letters of reference indicate corresponding parts in all the figures.

This invention relates to that class of miners' picks which are provided with detachable points, of which a supply may be conveniently carried; and it consists in certain improvements in the construction of the same, which will be hereinafter fully described, and particularly pointed out in the claim.

In the drawings hereto annexed, A represents the body of the pick, having the eye B, and provided near its ends with transverse openings or mortises C, from which openings D, square in cross-section, extend to the ends of body A, which said ends are beveled, as at E.

The points which are denoted by letter F are provided with shanks G, fitting in the openings D of the body, and having screw-threaded stems H, extending into the mortises C. The inner ends of the points around the shanks G are provided with beveled flanges H', corresponding with and fitting over the beveled ends E of the pick-body A. The points are secured to the body by nuts I, access to which may be had through the mortises C, by means of a suitably-constructed wrench.

The operation and advantages of my invention will be readily understood.

The points may be readily detached or adjusted, and, being light, a considerable supply of them may be easily carried. By tightening the nuts after the points have been placed in position the beveled flanges of said points are wedged or clamped upon the beveled ends of the body A, thus making the attachment very rigid and secure.

I claim and desire to secure by Letters Patent—

As an improvement in miners' picks, the combination, with the body A, having mortises C, openings D, and beveled ends E, of the detachable points F, having shanks G, threaded stems H, and beveled flanges H', and the nuts I, as herein described, for the purpose shown and specified.

In testimony that I claim the foregoing as my own I have hereto affixed my signature in presence of two witnesses.

WILLIAM H. SHENEMAN.

Witnesses:
W. A. KING,
WILLIAM BEALER.